Dec. 7, 1965   W. T. RENTSCHLER   3,221,623
PHOTOGRAPHIC CAMERA HAVING AUTOMATIC EXPOSURE SETTING MEANS
Original Filed Oct. 7, 1960   3 Sheets-Sheet 1

INVENTOR
WALDEMAR T. RENTSCHLER
BY Arthur A. March
ATTORNEYS

Dec. 7, 1965     W. T. RENTSCHLER     3,221,623
PHOTOGRAPHIC CAMERA HAVING AUTOMATIC EXPOSURE SETTING MEANS
Original Filed Oct. 7, 1960     3 Sheets-Sheet 2

INVENTOR
WALDEMAR T. RENTSCHLER
BY Arthur A. March
ATTORNEYS

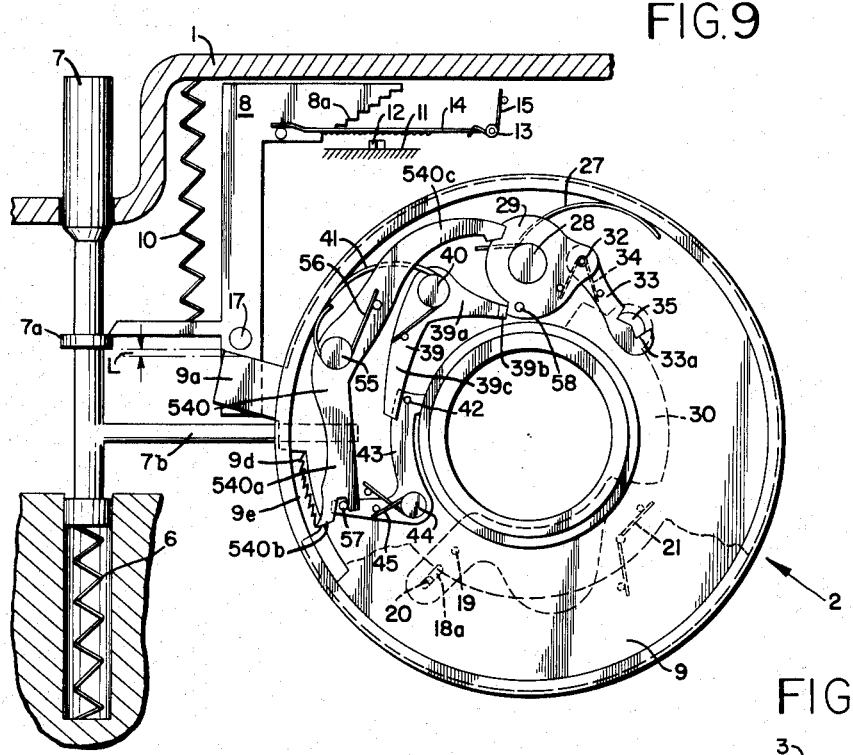
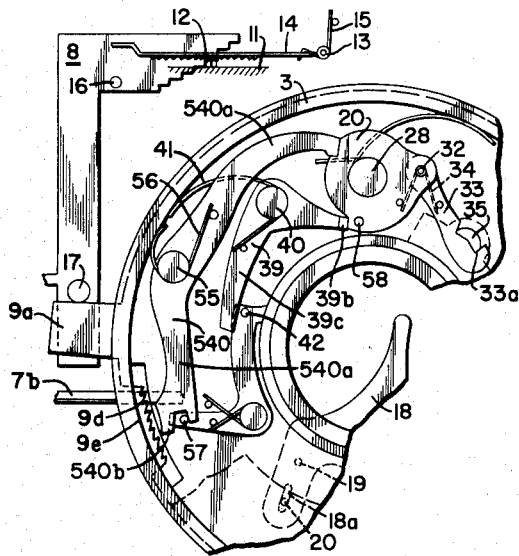
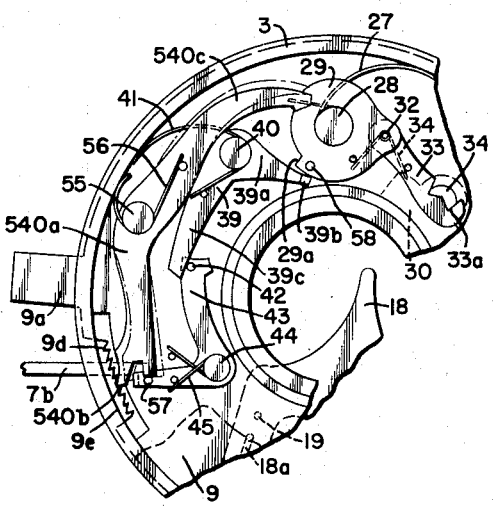

United States Patent Office 3,221,623
Patented Dec. 7, 1965

3,221,623
PHOTOGRAPHIC CAMERA HAVING AUTOMATIC EXPOSURE SETTING MEANS
Waldemar T. Rentschler, Calmbach (Enz), Germany, assignor to Alfred Gauthier, G.m.b.H., Calmbach (Enz), Germany, a corporation of Germany
Original application Oct. 7, 1960, Ser. No. 61,209, now Patent No. 3,105,427, dated Oct. 1, 1963. Divided and this application Feb. 14, 1962, Ser. No. 180,063
Claims priority, application Germany, Oct. 8, 1959, A 7,439
2 Claims. (Cl. 95—10)

This application is a division of copending application Serial No. 61,209, filed October 7, 1960, now Patent No. 3,105,427, and entitled Photographic Camera Having Automatic Exposure Setting Means.

This invention relates to photographic cameras of the type provided with automatic exposure setting devices, wherein a movable sensing member, which is activated by operation of the camera or shutter release and is connected to an exposure setting member, is responsive to the position of the movable member of an exposure meter incorporated in the camera, thereby to effect adjusting movement of the setting member to a position which is suitable for making the exposure.

In cameras of the above type the automatic exposure setting, which is effected as a consequence of actuation of the camera or shutter release, involves setting into motion the sensing member whereby the latter is brought to an adjusted position which corresponds to the prevailing light intensity and to additional exposure factors set by the operator. The sensing member, being connected with the exposure setting member, shifts the latter so as to adjust the diaphragm or shutter speed, or both. The sensing member is returned to its initial or starting position in response to the release of the shutter or camera release member, as by removal of pressure therefrom. During such return operation, the exposure setting member in prior known arrangements was also shifted to a starting or end position. With this prior mode of operation the correct exposure setting exists only for the time during which the camera release is held in its depressed position. This produces the result that certain types of exposures, especially exposures involving long times as well as exposures utilizing the delayed action device, can be carried out only if the operator is extremely careful, and in fact in some circumstances such special exposures cannot be carried out at all.

In order to eliminate these disadvantages, there have been proposed in the past locking or detent devices which hold the camera or shutter release in its depressed position until the advance of the film for the next picture has been completed. However, such devices have the limitation that the reading of the light conditions as given by the exposure meter is not again available to the operator directly after the exposure. Instead, the operator if desiring to utilize the exposure meter must reset the parts by the act of advancing the film to the next picture, this causing a return of the camera release and of the sensing member to their starting positions. Moreover, there is a further disadvantage in that the movable member of the measuring mechanism of the exposure meter is being held in a fixed or locked position after the exposure, until the film is again advanced. Such locked position is not desirable if the camera should be subjected to shock, vibration or the like, since the said movable member is better able to withstand these conditions if it is allowed to move or shift. Depending on when the film is advanced, the locking of the movable member may be retained in locked position for considerable periods of time.

The above disadvantages and drawbacks are obviated by the present invention, and one object of the invention is to provide a novel and improved photographic camera of the kind having automatic exposure setting means as above identified, wherein exposures characterized by long exposure times or by the use of a delayed action device may be effected in a simple, economical and dependable manner.

This is accomplished, in accordance with the invention, by the provision of a novel combination in the camera wherein a locking or holding device is arranged for the purpose of retaining the exposure setting member in its adjusted position as initially determined by the shifted position of the movable member of the exposure meter, said locking device comprising a movable detent member which is shifted into locking or holding position in response to actuation of the camera or shutter release and after the exposure setting member has been adjusted, such detent member being released and rendered inoperative by a part of the shutter drive mechanism after the operation of the shutter has been completed.

There is thus obtained the advantage, in photographic cameras of the specified type, that exposures of any kind, especially exposures having long exposure times or those utilizing the delayed action device, may be carried out without requiring that the operator pay the slightest attention to the handling or manipulation of the shutter or camera release, this being effected in an economical manner while at the same time there is afforded the greatest possible protection to the movable member of the exposure meter, and to the associated mechanism, from shock, vibration etc. These advantages result from the provision of the locking or detent device which retains the exposure setting member in the adjusted position determined by the movable member of the measuring mechanism of the exposure meter. Such retention is maintained completely independently of subsequent movement of the camera or shutter release after the same has been initially actuated or depressed, and is effective only until such time as the operation of the camera shutter has been completed. This mode of operation produces a maximum degree of reliability in obtaining automatic exposure settings regardless of the type of exposure and without involving appreciable additional cost. In addition, by arranging for the disengagement of the movable member of the measuring mechanism and the sensing member as a consequence of return movement of the camera or shutter release, the present organization insures freedom of movement of the said movable member of the measuring mechanism immediately after the camera or shutter release has returned to its initial or starting position. Accordingly, such movable member is in the best possible condition to absorb shocks, vibration and the like without being damaged, and is also again immediately available to enable the operator to obtain an indication or reading of the prevailing light conditions.

The actuation of the said locking device in response to operation of the camera or shutter release may be effected in various ways. For example, a locking device having a detent member may be made operative in response to actuation of the camera or shutter release by shifting the locking member thereof in response to movement of the said camera or shutter release, and a pawl or dentent may be provided for actuation by a part of the shutter driving mechanism after the operation of the shutter has been completed, to release the detent member for return to its non-locking position.

This arrangement is especially adaptable for use in cameras and shutters of all types and kinds, since the locking mechanism is made operative not by the shutter drive mechanism but instead in response to operation of the releasing means that is utilized for such mechanism.

Another easy and time-saving assemblage of a photographic camera and intra-lens shutter incorporating the invention may further be effected by arranging the locking or detent member and the control part of the shutter drive mechanism or other release device within or on the housing of the intra-lense shutter.

This makes it possible to completely mount and finally adjust, during the assembly of the shutter, the said locking mechanism for the exposure setting member, as well as the control and operating members therefor. Thus, upon assembly of the camera it is merely necessary to establish a connection between the sensing member provided on one side of the camera and the exposure setting member which is arranged in or on the shutter.

The invention is illustrated by way of several embodiments, in the accompanying drawings, in which:

FIG. 1 is a front elevational view of the photographic intra-lense shutter with the cover plate of the shutter removed, and portions of the releasing and driving mechanism of the shutter are shown.

FIG. 2 is a fragmentary view partly in section and partly in elevation, of the front wall of the camera housing or case and of an intra-lens shutter assemblage about to be attached thereto. This figure further shows portions of a cocking device for the driving mechanism of the shutter illustrated in FIG. 1, including a cocking shaft which is mounted on the camera and is cooperable with the locking mechanism for the exposure setting member.

FIG. 9 is a diagrammatic front elevational view of an intra-lens shutter mounted on a camera and having the cover plate removed. Arranged within the shutter is a locking device for an exposure setting member as provided in accordance with the invention, which cooperates with the automatic setting mechanism. The shutter is shown in the cocked position.

FIG. 10 is a fragmentary view of the structure of FIG. 9, showing the camera release in depressed position, the various parts having the positions occupied immediately prior to release of the shutter.

FIG. 11 is a view similar to that of FIG. 10, but showing the released shutter in a specific phase of its running down movement. The locking device is in operative condition.

Figure 12:
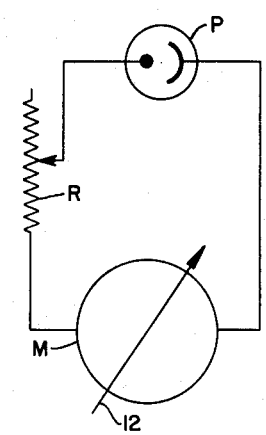

FIG. 12 is a schematic circuit diagram and diagrammatic representation of a measuring device and movable member thereof, of a type suitable for use in the camera of the present invention.

Figure 1:
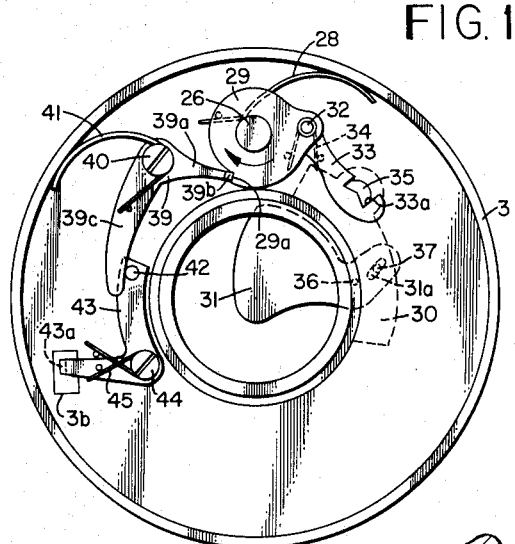
Figure 2:
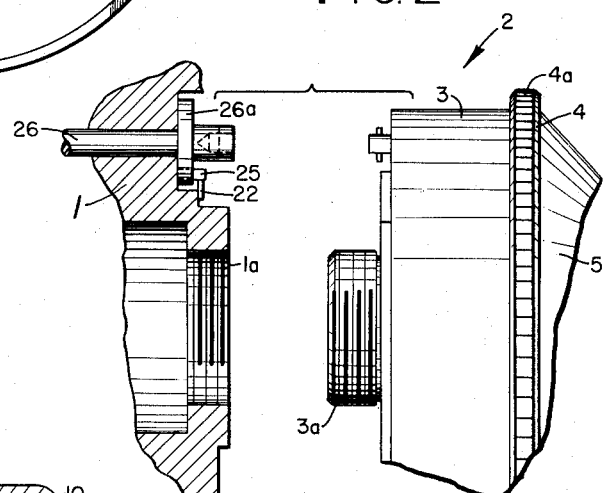

As shown, the housing or case of the photographic camera is indicated by the numeral 1. Provided on the front of the case 1 is a circular opening 1a (FIG. 2), into which an intra-lens shutter assemblage 2 can be inserted in a well known manner by means of a tubular threaded nozzle 3a projecting from the rear of the shutter housing 3. An exposure time or speed setting ring 4 is provided on the intra-lense shutter assemblage 2, said ring having a knurled finger grip 4a and being held in position in a well known manner by means of a front plate 5 which is arranged on the front of the shutter housing 3. Rotary adjustment of the speed setting ring 4 enables the exposure time of the camera to be adjusted, as will be understood. A camera or shutter release member 7 in the form of a plunger is longitudinally movable on the camera case 1, being shiftable in a direction at right angles to the axis of the shutter assemblage 2. The plunger 7 is biased upward as seen in FIGS. 1 and 2 by a helical compression spring 6, and downward movement of the plunger against the action of the spring 6 effects a release of the shutter. In addition, there is further provided in the camera case 1 a sensing member 8 which cooperates with an exposure setting member of the shutter for the purpose of automatically adjusting the shutter. The sensing member, in a well known manner to be described below, senses the position of a movable member of the measuring mechanism of an exposure meter which is built into the camera, this function taking place in response to actuation of the camera release 7. The exposure setting member which cooperates with the sensing member 8 is, in the illustrated embodiments of the invention, a diaphragm setting ring 9 which is provided on the rear of the shutter housing 3. The exposure setting member may, however, be for example the speed setting ring 4 of the shutter assemblage, or it may comprie an exposure value setting member, as will be readily understood.

Figure 3:
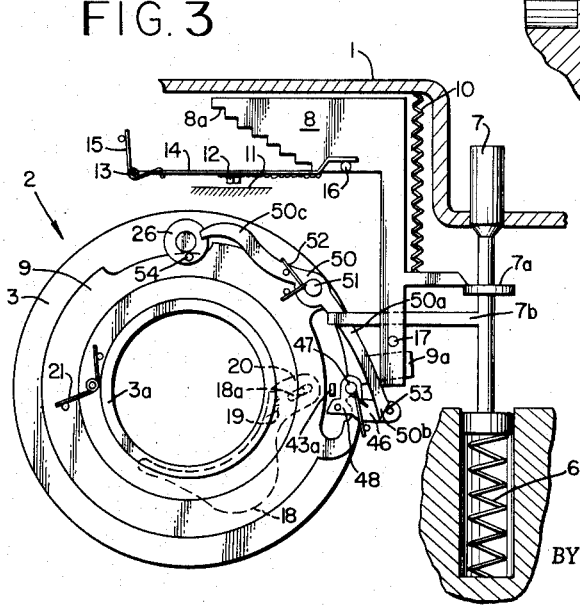
FIG. 3 is a diagrammatic elevational view taken from the rear of an intra-lens shutter mounted on a camera, this view illustrating a type of locking device for the exposure setting member on the rear of the shutter and being connected to an automatic setting mechanism. The shutter is in its cocked position.
Figure 4:
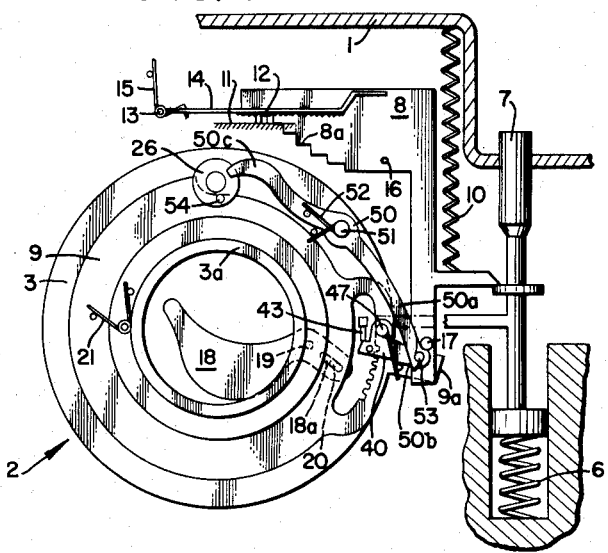
FIG. 4 is a view like that of FIG. 3, but showing the camera release in depressed position, just prior to release of the shutter.

The sensing member 8 may, for example, be constructed in the form of a slide which is guided on a fixed member of the measuring mechanism of the exposure meter. The sensing member 8 is shown as movable vertically in a direction parallel to the direction of movement of the release plunger 7. A helical compression spring 10 acts on the sensing member 8 and tends to keep it in engagement with a collar or flange 7a of the camera release 7. The spring 10 is, however, weaker than the compression spring 6 acting on the plunger 7 so that the sensing member 8 occupies the position shown in FIGS. 3 and 9 when the camera release is in its raised or non-influenced position. For the purpose of cooperating with the movable member of the measuring mechanism, the sensing member 8 has a stepped abutment edge 8a by means of which the member engages (after actuation or depressing movement of the plunger 7) under the action of its spring 10 a needle or pointer 12 connected to the movable member of the measuring mechanism. The needle 12 is shiftable over a fixed surface or base member 11. Prior to the sensing operation, the needle 12 is clamped in its adjusted position in a well known manner, by means of a clamping device comprising a lever 14 which is pivotally movable about an axis 13 and which engages a pin 16 of the sensing member under the action of a wire spring 15 at the time that the sensing member 8 is in its raised or starting position. In this position of the lever 14 the needle 12 is freely movable over the base 11. However, upon actuation of the camera release 7, the pin 16 becomes disengaged from the lever 14 whereupon the latter under the action of the spring 15 clamps the needle 12 in its adjusted position. As seen in FIGS. 1 and 2 the undersurface of the lever 14 is grooved or serrated so as to have a locking action on the needle 12. The clamping of the needle 12 is effected prior to adjustment of the diaphragm by the sensing member 8, and for this purpose the sensing member has an initial movement or idle path indicated by the letter L in FIG. 14.

For the purpose of cooperating with the sensing member, the diaphragm setting ring 9 has an arm 9a which is located in the path of movement of a pin 17 affixed to the sensing member 8. The diaphragm of the shutter assemblage, in the illustrated embodiments of the invention, comprises a plurality of segments or lamellas 18, which are pivotally positioned about fixed bearing pins 19 and have pin-and-slot connections 18a, 20 with the diaphragm setting ring 9. A light spring 21 tends to keep the ring 9 in the position shown in FIGS. 3 and 7, wherein the diaphragm is fully opened.

A sensing member having a stepped abutment edge which cooperates with a pivotally movable control member of an electric measuring device is also disclosed and described in my copending application Serial No. 22,000, filed April 13, 1960, now Patent No. 3,038,398, and entitled Photographic Camera With Automatic Exposure Setting.

In accordance with the invention, the above-described exposure setting mechanism is to be used for exposures of every kind, especially for those having long exposure times or those utilizing a delayed action device, and in accomplishing this the invention provides a novel combination with the above structure of a locking device which retains the diaphragm setting ring 9 in its adjusted position as determined by the position of the movable member or needle 12 of the measuring mechanism of the exposure meter. Further, the locking device has a movable locking or detent member which is shiftable into a locking position in response to actuation of the camera or shutter release 7 and after the diaphragm has been adjusted or regulated automatically, and which is released or shifted from its locking position by a part of the shutter drive mechanism after the shutter has completed its operation.

Referring to FIGS. 1 and 2, the moveable locking or detent member is constructed in the form of a lever 22. A lever 22 is carried by a pivot pin mounted on the camera. Accordingly, the lever 22 is provided with a recess in which pin 25 is movable. The pin 25 is affixed to a shaft 26 located within the camera, such shaft being connected to a film transport device in a well known manner which is not shown. The free end of shaft 26 is constructed as a coupling to receive a cocking shaft 27 for the shutter which is carried on the shutter assemblage 2 (see FIG. 2). A well known main driving disk 29 of the shutter driving mechanism is affixed to shaft 27, being powered by coil spring 28 as shown in FIG. 1.

In order to actuate a driving ring 30 for the shutter blades 31, there is provided a driving link 33 which is pivotally mounted in a well known manner on a pin 32 carried by the driving disk 29. By means of a notched portion 33a, the link 33 is drivingly connected to a pin 35 affixed to the shutter blade driving ring 30, and a spring 34 tends to maintain the link 33 engaged with the pin 35, as will be understood. With this arrangement, as is well known in the art, the driving ring has imparted thereto a reciprocating movement in response to clockwise running-down movement of the driving disk 29 (indicated by the arrow in FIG. 1) such running-down movement of the disk 29 and opposite movements of the ring 30 cause the shutter blades 31 to be first opened and thereafter to be again closed. The shutter blades 31 (only one of which is shown for the sake of clarity) are positioned about fixed pins 36 and have pin-and-slot connections 31a and 37 with the driving ring 30.

An arresting lever 39 is pivotally mounted about a pin 40 within the shutter assemblage 2 and serves in the illustrated forms of the invention to retain the shutter driving disk 29 in its cocked position, as shown in FIG. 1. One arm 39a of the lever 39 has a lug 39b which engages a projection or shoulder 29a of the disk 29, whereas the other arm 39c of the lever 39 engages under the action of the spring 41 a pin 42 of a releasing lever 43. The latter is also pivotally positioned about an axis 44 in the shutter and is biased in a clockwise direction by a spring 45. To establish a connection with the shutter release, the lever 43 has a lug 43a which projects from the rear wall of the shutter housing 3, extending through a clearance slot 3b and is located in the path of movement of a shutter release. The arrangement of lug 43a is such that release of the cocked driving disk 29 by the arresting lever 39 takes place only when the sensing operation is halted in an adjusted position by the light-responsive needle of a measuring mechanism.

After the cocked driving disk 29 has been released by the arresting lever 39, the disk executes under the action of its driving spring 28, a clockwise rotary movement (see FIG. 1) during which the shutter blades 31 are first opened and then again closed (after an open position has been reached). The running-down movement of the shaft 26 is counterclockwise. At the start of this motion of the driving disk 29, the pin 25 becomes disengaged from lever 22. Such disengagement frees the arresting or detent lever 22 whereby, under the action of spring 24, it becomes engaged with the diaphragm setting ring and retains the ring in an adjusted position against the action of the spring acting on the ring.

As shown in the embodiment of FIGS. 3–8 the locking or detent lever 46 is shifted into its locked position by a member or part of the previously-described shutter or camera release device comprising the plunger 7, and is retained in this position by means of a detent mechanism which is releasable by a part of the shutter drive mechanism after the shutter has completed its operation.

The detent member in these figures is a two-armed lever 46 which is pivotally carried by a pin 47 mounted on the front wall of the camera, and is urged in a clockwise direction by a spring 48. The lever 46 has an arm 46a located in the path of movement of the arm 43a of the release lever 43. This causes the detent lever 46 to be shifted, when the camera release 7 is actuated, against spring action into the locking position shown in FIGS. 5 and 6. In this position, a pin or lug 49 affixed to the arm 46a engages a toothed portion 9c provided on the diaphragm setting ring 9.

Figure 5:
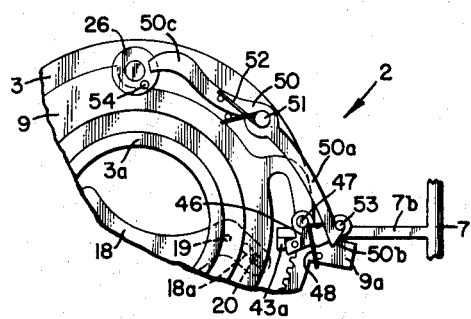
FIG. 5 is a fragmentary elevational view of the structures of FIGS. 4 and 5, showing the released shutter in a particular phase of its running-down movement. The locking device is in its operative condition.
Figure 6:
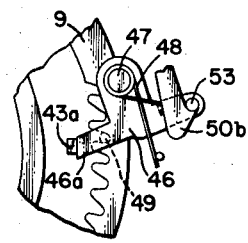
FIG. 6 is an enlarged fragmentary elevational view of the locking device in the position illustrated in FIG. 5.
Figure 7:
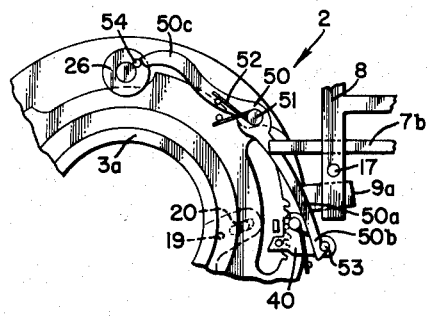
FIG. 7 is a view similar to that of FIG. 5, showing the shutter in its run-down or non-cocked position.
Figure 8:
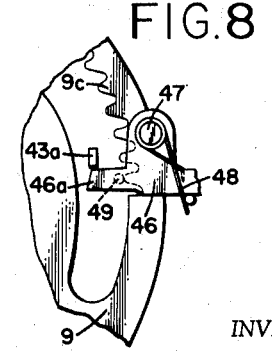
FIG. 8 is an enlarged view of the locking device as it is positioned in FIG. 7.

As mentioned above, a detent mechanism cooperates with the lever 46 in order to retain the latter in its operative position. This detent mechanism comprises a two-armed lever 50 which is pivotally mounted about a pin 51 provided on the front side of the camera and is urged in a counterclockwise direction by a spring 52. One arm 50a of the lever 50 has a projection 50b which, upon the arresting or detent lever 46 being in its locking position, engages one side of a pin 53 provided on the lever 46 under the action of the spring 52 and retains the lever 46 in locking position against the action of the spring 48 (FIG. 5). The other arm 50c of the lever 50 on the other hand is located in the path of movement of a pin 54 affixed to the cocking shaft 26. Towards the end of the running-down movement of the cocking shaft 26 and the driving disk 29, and after the shutter has completed its operation, the pin 54 engages the arm 50c of the lever 50, pivoting the latter against the action of the spring 52 (FIG. 7).

This causes the arresting lug or projection 50b to become disengaged from the pin 53 so that the lever 46 under the action of its spring 48 returns to the starting position shown in FIGS. 4, 5, 7 and 8. During this movement the arresting pin 49 of the lever 46 becomes disengaged from the toothed portion 9b of the diaphragm setting ring 9. This produces the result that the diaphragm setting ring is allowed to return to its starting position under the action of the spring 21.

FIGS. 9–11 show still another embodiment of the invention, comprising a photographic camera having an intra-lens shutter wherein the movable locking member and the associated parts of the shutter drive mechanism and of the shutter release device which cooperate with the locking member are located in the housing 3 of the intra-lens shutter. The movable locking member is constructed as a two-armed lever 540 which is positioned about a pin 55 located in the shutter housing 3 and is urged in a clockwise direction by a spring 56. One arm 540a of the lever 540 has an arresting lug 540b which cooperates with a toothed portion 9d provided on the diaphragm setting ring 9. When the camera release is not depressed, the arm 540a engages under the action of the spring 56 a pin 57 of the release lever 43, and the arresting lug 540b is disengaged from the toothed portion 9d. The other arm 540c of the lever 540 cooperates with the main driving disk 29 of the shutter, and for this purpose it is located in the path of movement of a pin 58 affixed to the driving disk 29.

Upon the camera release 7 being actuated against the action of the spring 6, the arm 7b thereof engages, after the position of the measuring mechanism needle 12 has been sensed and the diaphragm has been set, the lug 43a of the release lever 43, pivoting the same in a counter-clockwise direction (FIGS. 9, 10 and 11). Due to this movement, the arresting lever 39 which is retaining the driving disk 29 in the cocked position is pivotally shifted clockwise against the action of the spring 41 so that the projection 39b becomes disengaged from the projection 29a of the driving disk. The disk is thus released for clockwise running-down movement. At the same time the pin 57 of the release lever 43 becomes disengaged from the arresting lever 540, whereby the latter pivots in a clockwise direction under the action of its spring 56, causing the lug 540b thereof to come into engagement with the toothed portion 9d of the diaphragm setting ring 9. After the shutter has completed its movement, the locking device 9d, 540b is released, this occurring toward the end of the clockwise running-down movement of the driving disk 29 when the pin 58 comes into engagement with the arm 540c of the lever 540, returning the latter against the action of its spring 56 to the position shown by the broken lines in FIG. 11. During this return or restoring movement of the lever 540, the lug 540b becomes disengaged from the toothed portion 9d, so that the diaphragm setting ring 9 is able to return to its starting position under the action of the spring 21.

FIG. 12 shows schematically an electrical measuring device and circuit therefor which may be used in the camera of the invention. The exposure meter includes a photo-electric cell P, connected in circuit with a calibrating resistor R and a measuring device or instrument movement M, the latter having a movable member including the pointer or needle 12. When light strikes the photo-electric cell P it energizes the instrument movement M and deflects the needle 12, as is well understood in the art. As already mentioned, the needle 12 is movable over a fixed table or base surface member 11, and may be clamped thereto in any adjusted position by the clamping lever 14.

I claim:

1. A photographic camera of the type having an exposure meter provided with a measuring mechanism and movable member thereof, and having a sensing member and exposure setting member connected thereto and actuated thereby, said sensing member moving to an adjusted position as determined by the movable member in response to actuation of the camera release, characterized by the provision of a releasable locking device having a movable detent member acting directly on said exposure setting member for holding the exposure setting member in any of its various adjusted positions, means for rendering operative said locking device in response to actuation of the camera release after adjustment of the setting member has taken place, and means for rendering said locking device inoperative in response to movement of a member of the shutter drive mechanism after the shutter has been closed thereby, said means rendering operative the locking device comprising a movable member of the camera release, and a releasable detent mechanism for holding the detent member in operative position, said means for rendering inoperative the locking device comprising a member of the shutter drive acting on said detent mechanism.

2. In a camera construction having an intra-lens shutter and housing therefor, a camera release means including a release lever, an exposure meter including a measuring mechanism and a movable member, and an exposure setting means operatively connected to a sensing member and actuated thereby for moving the same to an adjusted position as determined by the movable member in response to the actuation of a camera release, the improvement of a releasable locking means adapted to operate directly on said exposure setting member for locking the same in its adjusted position, said locking means including a two-armed lever pivotally mounted in the intra-lens shutter housing, one arm of said lever having an arresting lug thereon, and said exposure setting means including a ratchet section, means on said locking lever directly engaging the release lever of said camera release means in the inoperative position thereof and whereby said arresting lug is moved into engagement with said ratchet section in response to the actuation of the camera release means after the exposure setting means has reached its adjusted position, and a shutter drive means operating on the other arm of said locking lever for effecting the release of said arresting lug from said ratchet section only after the shutter drive means has completed its operation.

References Cited by the Examiner
UNITED STATES PATENTS 3,000,282    9/1961    Noack _____ 95—10
3,105,427    10/1963   Rentschler _____ 95—10

NORTON ANSHER, Primary Examiner.

D. B. LOWE, EMIL G. ANDERSON, Examiners.